United States Patent
Wright et al.

(10) Patent No.: US 8,194,351 B2
(45) Date of Patent: Jun. 5, 2012

(54) SUSPENSION ASSEMBLY WITH MOLDED STRUCTURES

(75) Inventors: John S. Wright, Minneapolis, MN (US); Jagdish L. Agrawal, Minneapolis, MN (US); Zine-Eddine Boutaghou, Vadnais Heights, MN (US); Joseph H. Sassine, Lakeville, MN (US); Andrew D. White, Brooklyn Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 1305 days.

(21) Appl. No.: 11/102,055

(22) Filed: Apr. 8, 2005

(65) Prior Publication Data
US 2006/0227463 A1    Oct. 12, 2006

(51) Int. Cl.
*G11B 5/48*    (2006.01)

(52) U.S. Cl. .................................... 360/244.2

(58) Field of Classification Search ............ 360/294.4, 360/244.2, 244.3, 244.4, 244.5, 244.6, 244.7, 360/244.8, 245.9, 244
See application file for complete search history.

(56) References Cited

U.S. PATENT DOCUMENTS

| | | | |
|---|---|---|---|
| 4,760,478 A | 7/1988 | Pal et al. | |
| 4,996,623 A | 2/1991 | Erpelding et al. | |
| 5,185,683 A * | 2/1993 | Oberg et al. | 360/244.6 |
| 5,187,625 A | 2/1993 | Blaeser et al. | |
| 5,677,815 A | 10/1997 | Chan | |
| 5,818,667 A | 10/1998 | Larson | |
| 5,901,017 A | 5/1999 | Sano et al. | |
| 5,966,269 A | 10/1999 | Marek et al. | |
| 5,978,178 A | 11/1999 | Adley | |
| 6,151,195 A | 11/2000 | Kajitani | |
| 6,198,606 B1 * | 3/2001 | Boutaghou et al. | 360/294.3 |
| 6,215,629 B1 | 4/2001 | Kant et al. | |
| 6,288,876 B1 | 9/2001 | Albrecht et al. | |
| 6,320,730 B1 | 11/2001 | Stefansky et al. | |
| 6,404,596 B1 | 6/2002 | McReynolds et al. | |
| 6,452,753 B1 | 9/2002 | Hiller et al. | |
| 6,469,872 B1 | 10/2002 | Kant et al. | |
| 6,617,762 B2 | 9/2003 | Kurano et al. | |
| 6,634,085 B1 | 10/2003 | Schmidt et al. | |
| 6,785,096 B2 | 8/2004 | Kuwajima et al. | |
| 6,791,783 B2 * | 9/2004 | Nakagawa | 360/75 |
| 6,992,861 B2 * | 1/2006 | Suzuki et al. | 360/244.3 |
| 7,016,159 B1 * | 3/2006 | Bjorstrom et al. | 360/294.6 |
| 7,136,261 B2 * | 11/2006 | Bhattacharya et al. | 360/244.9 |
| 7,333,402 B2 * | 2/2008 | Ishii et al. | 369/13.12 |
| 7,352,533 B1 * | 4/2008 | Bjorstrom | 360/244 |
| 2002/0085313 A1 * | 7/2002 | Boutaghou et al. | 360/244.9 |
| 2002/0154441 A1 | 10/2002 | Tadepalli et al. | |
| 2002/0176209 A1 | 11/2002 | Schulz et al. | |

* cited by examiner

*Primary Examiner* — Angel A. Castro
(74) *Attorney, Agent, or Firm* — McCarthy Law Group

(57) ABSTRACT

A support assembly includes a base layer, a circuit defined along the base layer, and a first material molded on at least a portion of the base layer. The first material substantially forms a shape of at least a portion of the support assembly. Further disclosed is a molded suspension assembly. The molded suspension assembly includes a thin and elongate metallic substrate and a non-metallic material molded along at least a portion of one side of the metallic substrate. The non-metallic material interlocks with the metallic substrate. The molded suspension assembly includes a transducer support area at or near a first end of the molded suspension assembly.

22 Claims, 9 Drawing Sheets

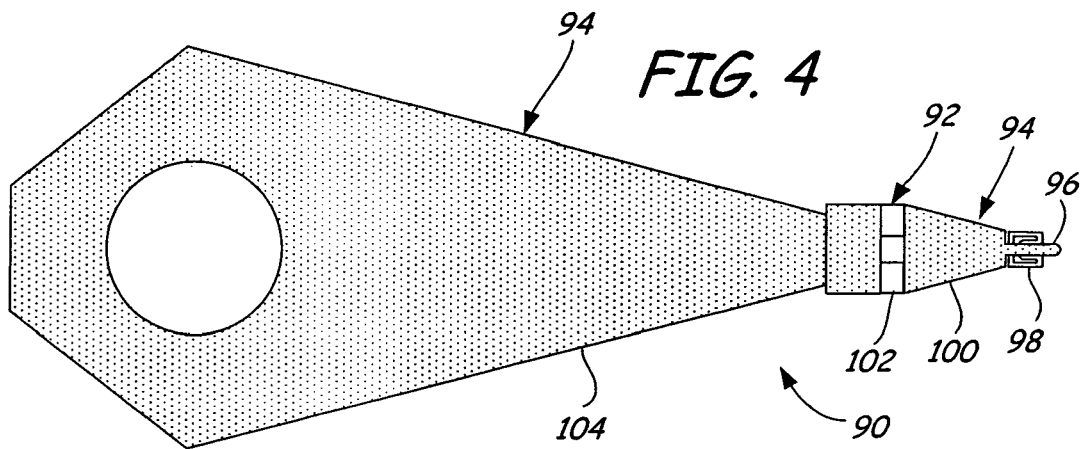
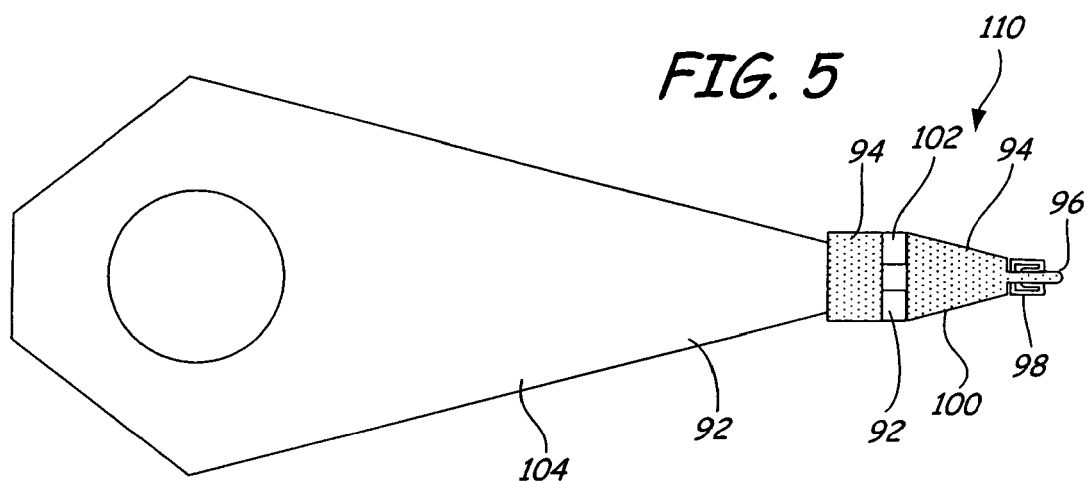
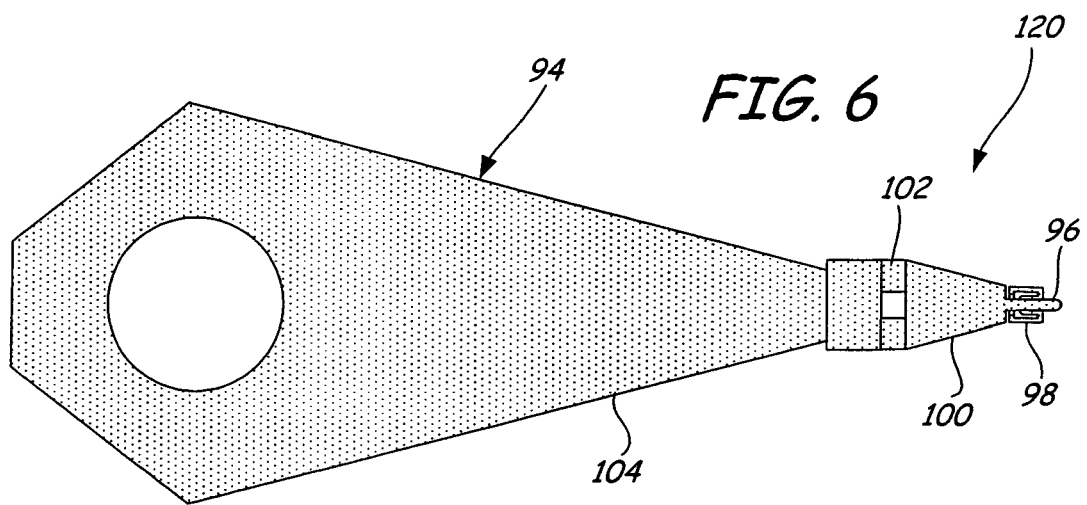

SUSPENSION ASSEMBLY WITH MOLDED STRUCTURES

BACKGROUND OF THE INVENTION

The present invention relates to support assemblies for supporting a transducer, and more particularly to support assemblies that included molded structures.

Hard disc drives (HDDs) typically comprise one or more discs, each disc having concentric data tracks for storing data. Where multiple discs are used, a stack is formed of co-axial discs having generally the same diameter. A transducing head carried by a slider is used to read from and write to a data track on a disc. The slider is carried by head arm assembly (HAA) that includes an actuator arm, a suspension, and a gimbal. As the disc is spun, the slider glides above the surface of the disc on a small cushion of air. The actuator arm movably positions the slider with respect to the disc. A plurality of actuator arms may be connected to a common E-block for common rotation. The suspension includes a base plate, a pre-load bend region, and a load beam. The slider is supported and biased towards the rotating discs by the suspension. The gimbal supports the slider and permits pitch and roll movements. In addition, electrical connections routed along the HAA are used to connect the transducing head to circuitry (e.g., a printed circuit card assembly (PCCA) and a pre-amp) located behind the HAA.

In operation, the slider is positioned above a data track on the disc by moving the actuator arm about an axis using a large-scale actuation motor, such as a voice coil motor. A small-scale microactuation motor connected to the suspension can be used for finely positioning the transducing head relative to data tracks on the disc. Such small-scale microactuation motors typically produce small-scale movements in response to an applied voltage.

When a drive enters a stopped state, the slider is positioned so that it does not contact the data tracks on the disc. This can be accomplished with contact start-stop (CSS) or load/unload (L/UL) designs. With CSS designs, a transducer parks on a textured zone at an inner diameter of the disc when in an inactive state. With L/UL designs, a lift tab is included on the suspension. Lift tabs are formations connected to the suspension that generally extend beyond a head gimbal assembly. The lift-tab provides a contact surface for loading and unloading a HAA from an associated, ramp structure, which provides a landing location for supporting the HAA in an inactive state. When the lift tab engages (or parks) on the associated ramp structure, the slider is supported in a way that prevents contact with the disc.

Numerous problems are faced when designing an HAA. For instance, windage, resonance, mass, stiffness, and particle generation all present design problems.

Thus, a support assembly for supporting a transducer is needed that is inexpensive to manufacture and reduces problems associated with prior art designs.

BRIEF SUMMARY OF THE INVENTION

The present invention relates to a method of making a support assembly that includes providing a base layer, providing a circuit defined along the base layer, and molding at least a portion of the base layer with a first material that substantially forms a shape of at least a portion of the support assembly capable of supporting a transducer.

The present invention further discloses a molded suspension assembly. The molded suspension assembly includes a thin and elongate metallic substrate and a non-metallic material molded along at least a portion of one side of the metallic substrate. The non-metallic material interlocks with the metallic substrate. The molded suspension assembly includes a transducer support area at or near a first end of the molded suspension assembly. Raised features can be molded on the suspension. Further disclosed is an molded suspension assembly.

BRIEF DESCRIPTION OF THE DRAWINGS

FIG. 4 is a schematic representation of an molded HAA.

FIG. 5 is a schematic representation of another molded HAA.

FIG. 6 is a schematic representation of a molded HAA.

DETAILED DESCRIPTION

Figure 1A:
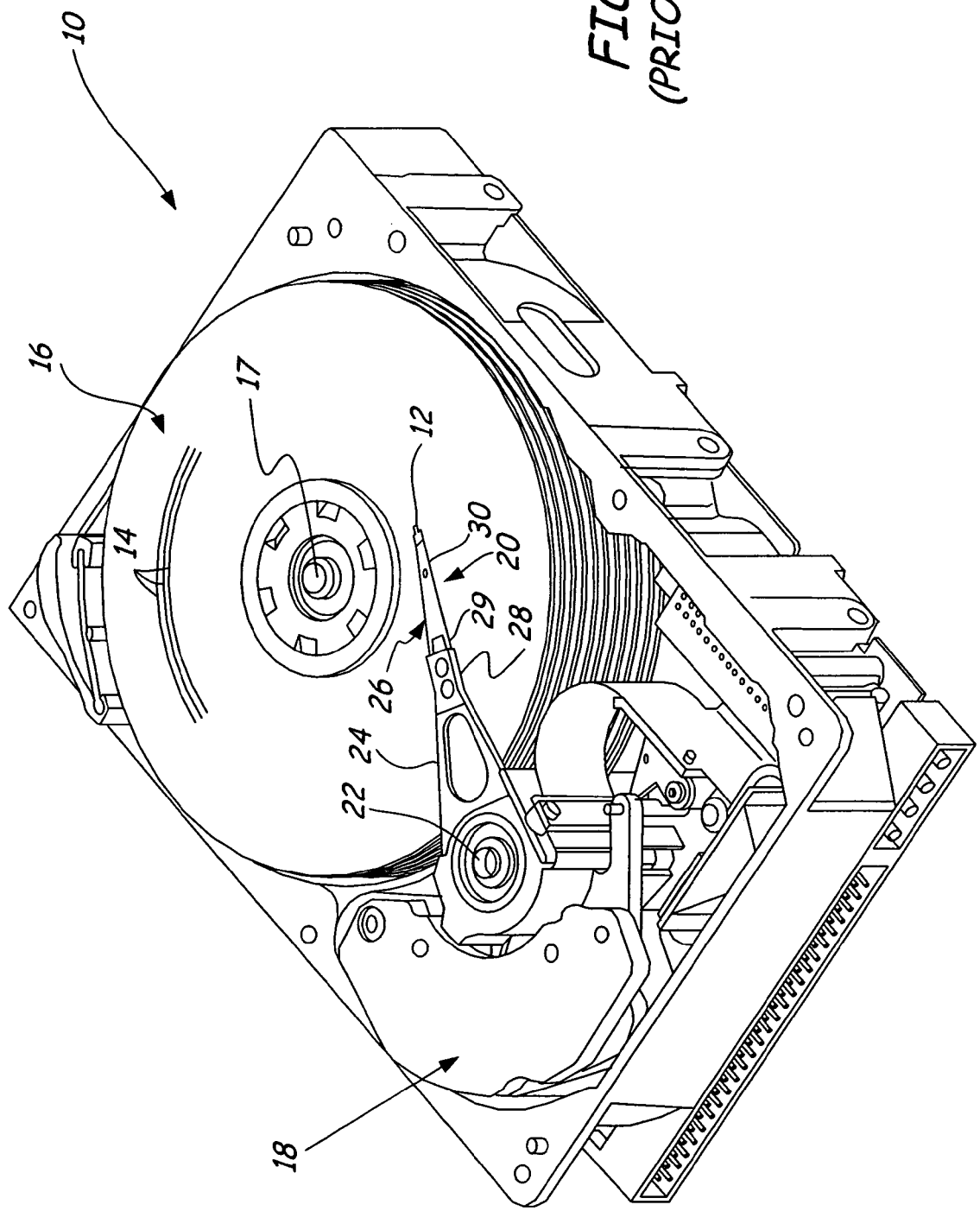
FIG. 1A is a perspective view of a prior art disc drive actuation system.

FIG. 1A is a perspective view of a prior art hard disc drive (HDD) system 10 for positioning a slider 12 over data tracks 14 of a magnetic storage medium 16, such as a rotatable disc. A plurality of axially-aligned discs having generally the same diameter can be arranged in a stack for common rotation on a spindle 17. The HDD system 10 includes a large-scale actuation motor (or large-scale positioning means), such as a voice coil motor (VCM) 18, arranged to rotate a head arm assembly (HAA) 20 about an axis 22. The HAA 20 includes an arm 24 (e.g., a unimount or stacked arm), a suspension 26 supported by the arm 24, and a gimbal (not shown). A plurality of actuator arms may be connected to a common E-block at the axis 22 for common rotation. The suspension 26 includes a baseplate 28, a pre-load bend region 29, and a load beam 30. The gimbal (not shown) is connected to an extended end of the suspension 26, and carries the slider 12 while permitting pitch and roll movements. The slider 12 is supported and biased towards the storage medium 16 by the suspension 26. The slider 12 carries a transducer (not shown) that can be used, for instance, for writing and reading data to and from the data tracks 14 of the storage medium 16. Electrical circuitry (not shown) routed along the HAA 20 are used to connect the transducer head to circuitry (e.g., a printed circuit card assembly (PCCA)) located within the HDD system 10 behind the HAA 20.

The disc 16 can be rotated about the spindle 17, which causes the slider 12 to "fly" a small distance above the surface of the disc 16 on a cushion of air. To position the slider 12 above data tracks 14 on the disc 16, the VCM 18 actuates large-scale movements of the HAA 20 about the axis 22 so that the HAA 20 is moved in an arc across the surface of the disc 16. This arc-shaped movement allows the slider 12 to be moved from an inner diameter to an outer diameter of the disc 16 so that the slider 12 can be positioned above a particular data track on the disc 16.

Figure 1B:
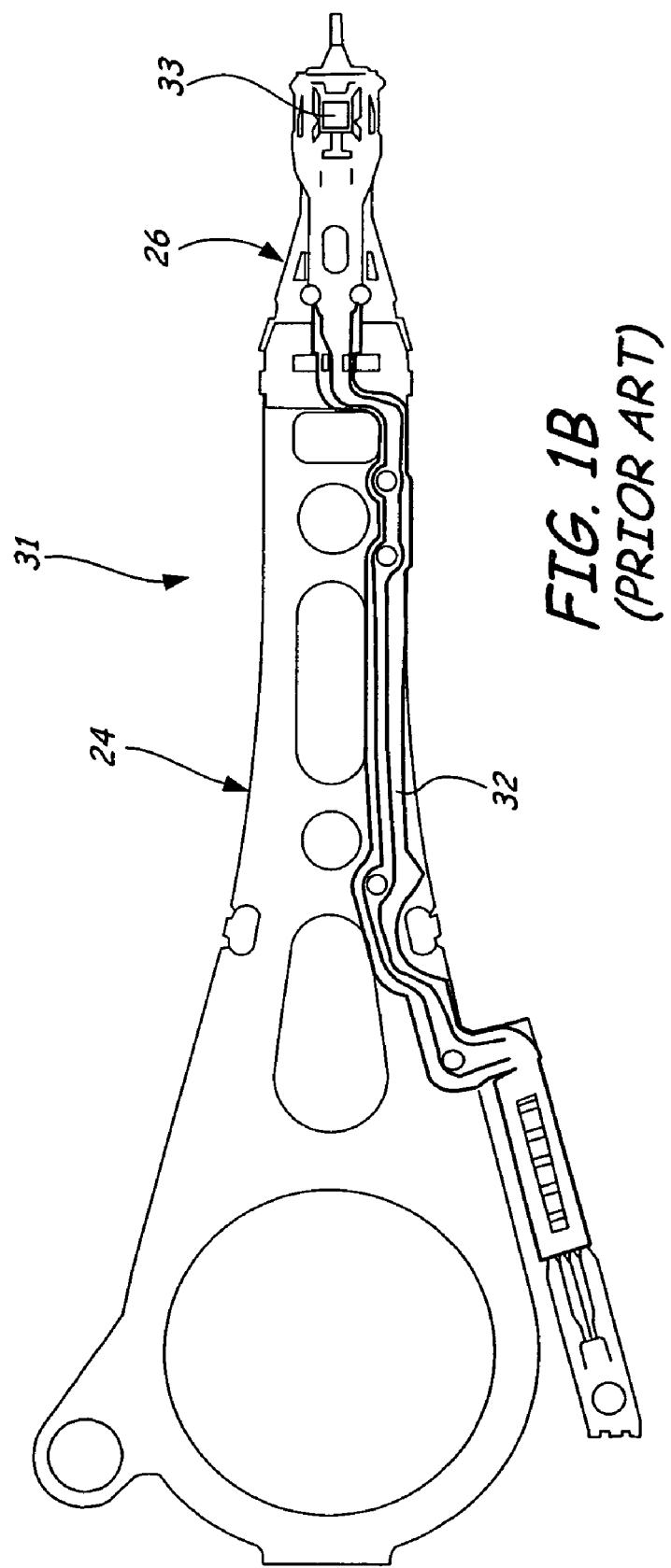
FIG. 1B is a bottom view of a prior art trace gimbal assembly.

FIG. 1B is a bottom view of a prior art HAA 31, showing a disc-facing side of the HAA 31. The HAA 31 includes electrical circuitry 32 (e.g., electrical traces) defined thereon, and supports a slider 33.

In order to better understand the present invention, it is helpful to first discuss a number of problems that are faced in designing a HAA in accordance with the present invention. One problem is resonance (e.g., sway modes, torsional modes, bending modes, and combination modes). During drive operation, resonance causes decreased sensitivity in the form of undesirable fly height and off-track motion. It is desirable to increase resonance frequencies of a suspension to reduce resonance problems. The resonance of a suspension increases as a function of thickness (of the suspension) cubed.

Another problem is windage. Because airflows develop within a HDD during operation, windage-induced excitation can occur in the form of movement and vibration of HAA components. That windage excitation can cause non-repeatable runout (NRRO), which is a measure of non-repeatable off-track movement and vibration due to random factors. NRRO leads to read/write errors. It is desirable to decrease windage excitation.

Mass is also a concern. Mass of a HAA affects seek time (i.e., ability to reach a desired data track quickly) and shock performance (i.e., potential damage caused by shock-induced contact between the transducer and the disc). Actuator arms can be 16 mils (0.4064 millimeters) thick stainless steel, which results in an arm having a considerable mass. Moreover, mass of HAA components located further away from a pivot axis, such as a mass of the suspension, causes even greater inertial problems. It is desirable to decrease the mass of a HAA.

Furthermore, particle generation is problematic. Particle generation can cause contamination of a drive, which leads to damage and decreased performance. With load/unload operations, contact between a lift tab and a ramp creates tribology issues, and specifically a risk of particle generation. The risk of particle generation is increased where materials of different hardnesses are put into contact with each other. For example, a relatively hard metallic material (e.g., a metallic lift tab) can create a risk of particle generation when coming into contact with a plastic material of a lesser hardness (e.g., a plastic ramp). Smoothing and texturing operations to reduce such tribology concerns are often complex and costly. It is desirable to simply and efficiently minimize particle generation.

HAAs can have rails formed thereon for providing additional stiffness for optimizing stroke and sway frequencies for the microactuator (in relation to off-track motion). Those rails are typically manufactured with forming or bending processes, and may also require etching and other manufacturing processes to fabricate. In addition to increasing the number of manufacturing steps required to fabricate a suspension, formed rails create windage problems by acting like a "sail" having a substantial area for airflows to act upon, thereby inducing windage NRRO.

More generally, raised features such as rails are essentially two-dimensional features created using forming or bending processes. Such forming or bending processes are poorly suited to forming shapes in three dimensions, particularly intricate three-dimensional shapes. Design flexibility for fabricating raised features, such as rails, is therefore limited. It is desirable to increase design flexibility for the geometry of features disposed along a HAA, for example, three-dimensional raised features.

Figure 2A:
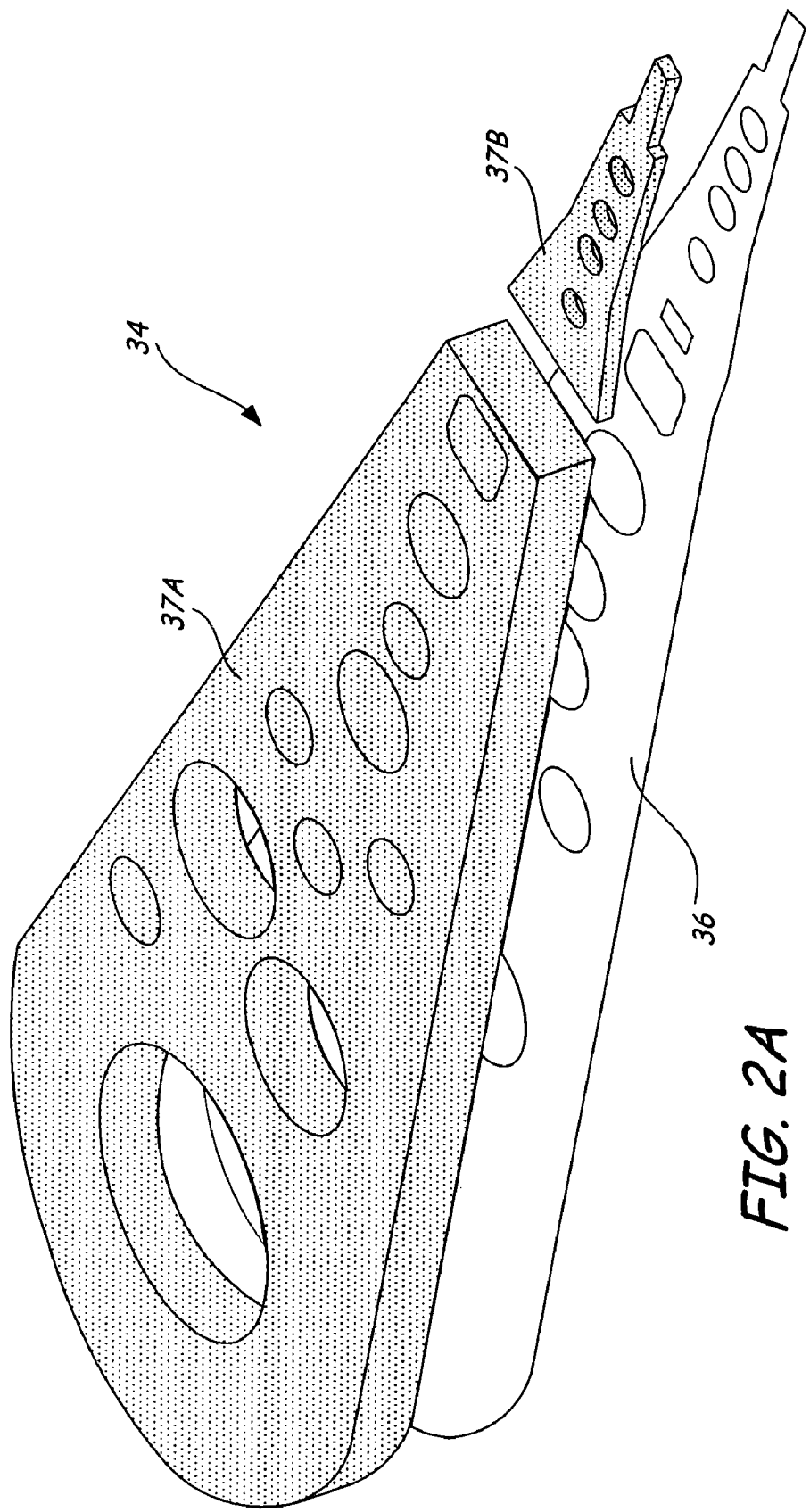
FIG. 2A is an exploded perspective view of an illustrative head arm assembly (HAA) according to the present invention.
Figure 2B:
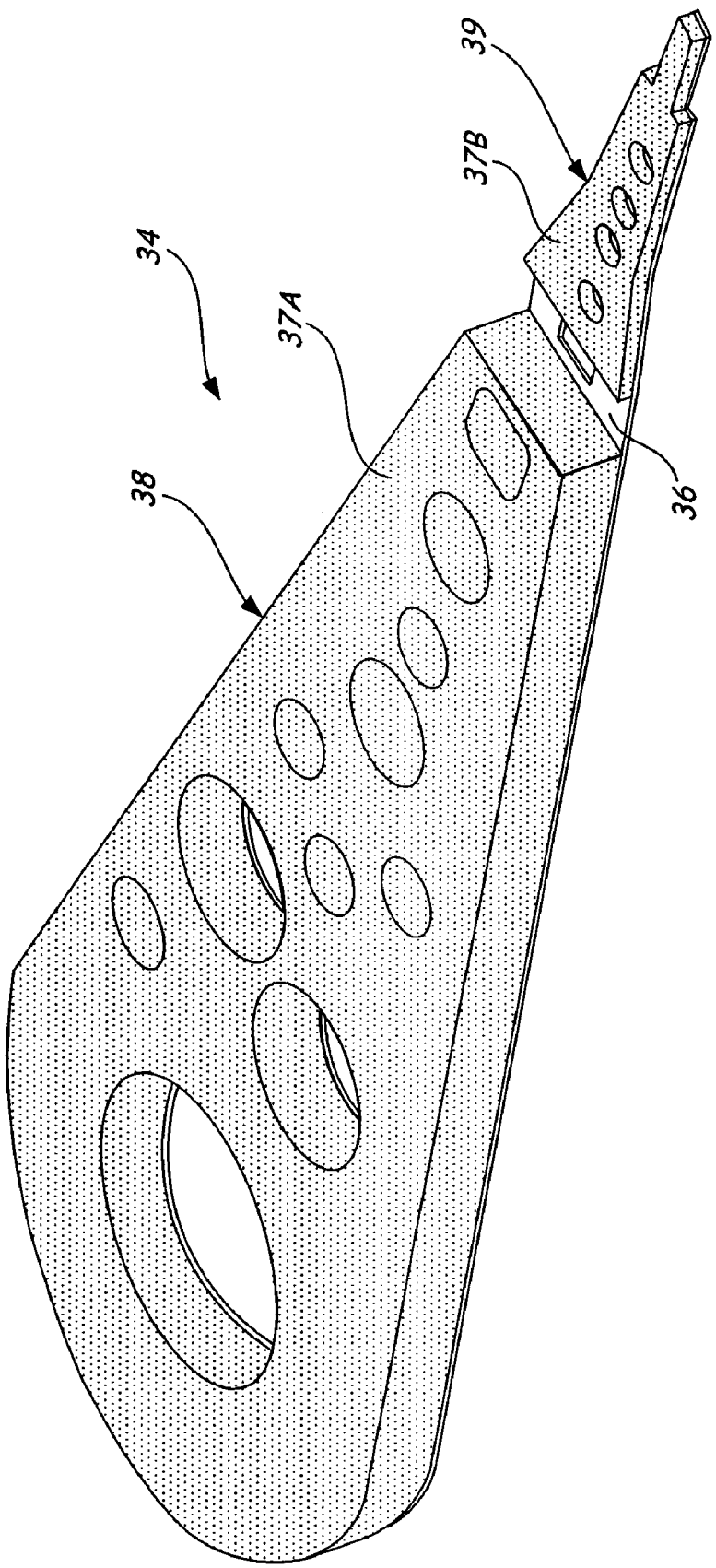
FIG. 2B is a perspective view of the illustrative HAA.

FIG. 2A is an exploded perspective view of an illustrative head arm assembly (HAA) 34 according to the present invention. The HAA 34 includes a thin substrate 36 and a moldable material 37A and 37B. The thin substrate 36 is a continuous sheet of material in a generally elongate shape that outlines a portions of the HAA 34. FIG. 2B is a perspective view of the illustrative HAA 34 with the moldable material 37A and 37B overmolded on portions of the thin substrate 36. The term "overmolding", as used herein, is a process of molding material over an existing part, such as injection molding material over a base or core or outline component, for example, a substrate or previously molded part. The term "moldable material" refers broadly to any material capable of being molded. Examples of such materials, presented merely as examples and not by way of limitation, are thermoplastic and/or thermosetting materials. The moldable material 37A is overmolded at an arm portion 38 and the moldable material 37B is overmolded at a suspension portion 39 of the illustrative HAA 34. The moldable material 37A and 37B can be overmolded in discrete and noncontiguous shapes to create a molded structure. For instance, the moldable material 37A at the arm portion 38 can have a greater thickness than the moldable material 37B at the suspension portion 39, for providing additional stiffness. The illustrative HAA 34 shown in FIGS. 2A and 2B is simplified to better illustrate the basic relationship between the thin substrate 36, which comprises a first material that is typically metallic, and the moldable material 37A and 37B, which comprises a second material that is typically an injection moldable material.

Figure 3:
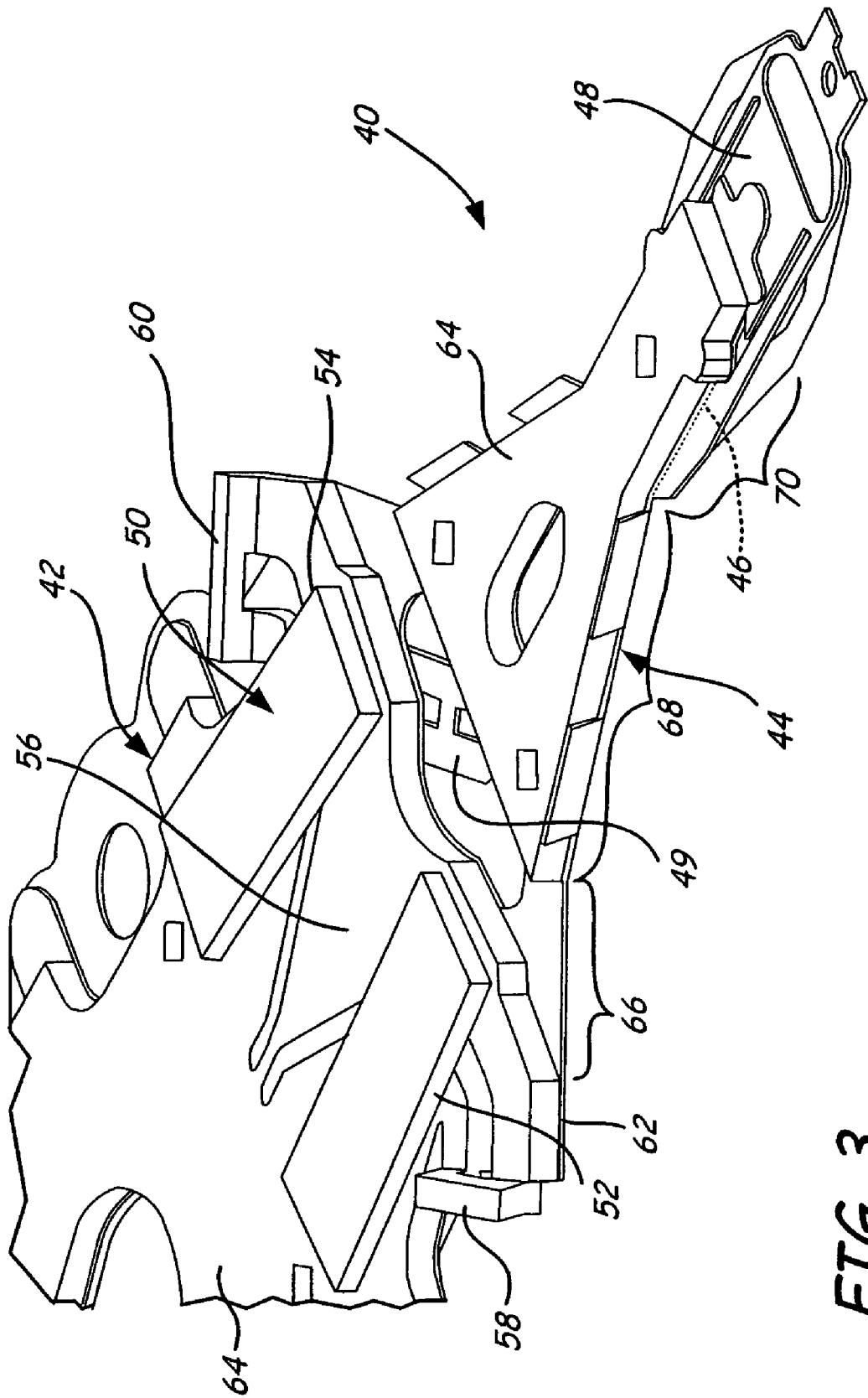
FIG. 3 is a perspective view of another HAA.

FIG. 3 is a perspective view of a portion of another HAA 40 according to the present invention. The HAA 40 includes an arm portion 42, a suspension portion 44, and a gimbal portion 46 having a gimbal tongue 48. The HAA 40 supports a slider (not shown), which is operatively connected to the gimbal 46 by electrical circuitry 49, and the slider supports a transducer (not shown), which can be used, for example, for writing and reading data to and from a magnetic storage medium. In the embodiment shown in FIG. 3, a small-scale microactuation motor 50 is disposed between the arm 42 and the suspension 44. The microactuation motor 50 includes a pair of piezoelectric elements 52 and 54, a base portion 56 and a pair of rails (or bobs) 58 and 60.

The HAA 40 includes a relatively thin substrate (or base layer) 62 and a moldable material 64 overmolded on portions of the substrate 62. The substrate 62 has a thickness of about 15 to about 30 microns. A thickness of the moldable material 64 is selected according to desired properties, such as stiffness, at particular locations along the HAA 40. The thickness of the moldable material 64 can vary along the HAA 40. For instance, an overall thickness (including the substrate 62 and the moldable material 64) of the arm portion 42 is generally substantially thicker than an overall thickness of the suspension portion 44. Generally speaking, the moldable material 64 has a substantially greater thickness than the substrate 62 throughout the HAA 40. There may be functional upper limits on a overall thickness of the HAA 40, including both the substrate 62 and the moldable material 64, imposed by a configuration of a HDD system. For example, portions of a HAA disposed between two stacked magnetic storage discs cannot have a thickness greater than a spacing between those two magnetic storage discs.

As shown in FIG. 3, the substrate 62 is continuous. In other words, the substrate 62 is a single sheet of material that forms an outline of the HAA 40, including the arm portion 42, the suspension portion 44, and the gimbal portion 46. The moldable material 64—overmolded on portions of the substrate 62—substantially defines a shape and stiffness of the HAA 40. The substrate 62 can be disposed along a bottom side of the HAA 40, meaning that the substrate 62 is disposed between the moldable material 64 and a disc in a HDD system. Positioning the substrate 62 at the bottom side of the HAA 40 can provide advantages such as facilitating gimbal-to-slider attachment.

The substrate 62 can comprise a trace gimbal assembly (TGA) (also known as a trace suspension assembly (TSA)), which is a known type of circuit assembly comprising a metallic substrate with electrical traces and bonding pads defined thereon for electrically connecting a transducer to electrical components such as a printed circuit card assembly (PCCA). TGAs can include other materials such as polyimide laminates. Moreover, electrical traces of TGAs can be routed along a HAA in a manner similar to that shown in FIG. 1A. According to the present invention, the HAA 40 can be defined simply by overmolding a TGA with the moldable material 64. Alternatively, a physically separate TGA can be positioned adjacent to the substrate 62. As a further alternative, electrical traces and pads (electrical bond pads, shunt pads, test pads, etc.) can be defined in the moldable material 64. Where adequate electrical traces and pads are defined in the moldable material 64, a physically separate circuit is not strictly necessary. However, electrical traces and pads defined in the moldable material 64 can be used in conjunction with a physically separate circuit, which can be electrically connected with the electrical traces and/or pads defined in the moldable material 64.

The suspension portion 44 includes a load beam having a pre-load bend region 66, an effective loading portion 68, and a gimbal attachment region 70. The suspension portion 44 provides a biasing force to the gimbal tongue 48. The pre-load bend region 66 is a portion of the suspension portion 44 made of a metallic material having a thickness of less than about 30 microns.

The microactuation motor 50 allows fine control and adjustment of positioning of the gimbal tongue 48 by permitting control of small-scale off track movements. The microactuation motor 50 operates by applying a voltage to the piezoelectric elements 52 and 54. The piezoelectric elements 52 and 54 change shape in response to the applied voltage, where one piezoelectric element expands and the other contracts. Such changes in shape of the piezoelectric elements 52 and 54 induce small-scale (off-track) movements of the gimbal tongue 48 for fine positioning control or fine tracking control of the transducer (not shown) carried by the slider (not shown) and the gimbal tongue 48. The base portion 56 is a support structure, which can be a separate structure attached to the HAA 40 or can be fabricated as a contiguous portion of the HAA 40 (e.g., as part of the arm portion 42). As shown in FIG. 1, the microactuation motor 50 is disposed behind the pre-load bend region 66 of the suspension 44, for inducing arcuate movements of the suspension 44 to finely position the gimbal tongue 48. Other types and configurations of microactuation motors can be used. For instance, a collocated microactuation motor can be used. "Collocated" refers to any motor that is in the same position as an object being moved by the motor. A collocated microactuation motor can be disposed adjacent the gimbal 46 for positioning the gimbal tongue 48 supporting a slider and/or a transducer. Such a collocated microactuator will generally include a support structure with a surface for attachment of a slider (or a transducer). Such microactuator structures can comprise the moldable material 64.

Overmolding is achieved by injection molding a moldable material over a base or core. A mold is used to define the desired geometry of the resultant structure. For instance, varying thickness of moldable material can be defined through the mold. Moreover, raised features can be defined with the mold. Portions of the substrate 62 can be kept free of moldable material by clamping the mold tightly to the substrate 62 at those locations. While it is possible to perform post-processing operations, such as the use of a $CO_2$ snow or a mechanical abrasive that does not cause contamination to remove "flash" (i.e., unwanted excess material created as a by-product of molding), it is preferred to eliminate the need for such post-processing through selection of moldable materials and mold design. Mold design principally affects what portions of the HAA 40 are overmolded, as well as the thickness and geometry of the moldable material 64 overmolded on the HAA 40.

It is possible to overmold the entire HAA 40 in a single molding operation. It is also possible to mold some components in initial molding operations and then overmold those previously-molded components together in one or more later molding operations. By overmolding components together, some attachment operations (e.g., suspension-to-arm attachment) can be eliminated.

The substrate 62 is a metallic material, such as stainless steel. The moldable material 64 is a filled plastic, fiber filled epoxy, or similar composite material of a type qualified for use within a HDD system and suitable for use with injection molding. More particularly, the moldable material 64 can be a polymeric or plastic material, such as liquid crystal polymer (LCP), polyimide (PI), and polyphenylene sulphate (PPS), with a short-strand carbon fiber filler. Strength of a composite plastic material is provided by the filler. Short-strand fiber fillers facilitate injection molding techniques by permitting the moldable material to flow into a mold, while still providing adequate stiffening characteristics. Moreover, filled plastics generally provide a higher stiffness-to-mass ratio than metallic materials like stainless steel. A particular moldable material utilized is selected according to characteristics such as plastic melt viscosity (unfilled), percentage of fill loading, fill strand geometry, mold geometry, desired molded part thickness, and desired molded feature geometry will influence selection of the particular moldable material for a given design.

Raised features (or raised structures) molded with the moldable material 64 can include stiffening structures, such as rails (or bobs), and windage-mitigation structures, such as riblets, air foils, and channels. Rails (or bobs) are features that can be used to increase stiffness and resonance modes (see, e.g., rails 58 and 60 in FIG. 3). Because of the great three-dimensional design flexibility associated with overmolding processes, features such as rails (or bobs) can be molded in a shape that reduces windage excitation. Air foils are raised features that influence airflow in desirable, ways. Riblets are aerodynamic surface formations that are believed to reduce the production of stresses associated with the growth and eruption of eddies in low-speed regions of airflow boundary layers as an airflow passes across a surface, thereby reducing drag. Riblets can take a variety of shapes and arrangements, which are chosen according to characteristics of a particular design application. Such features are described in commonly-assigned U.S. patent application Ser. No. 10/420,326, which is hereby incorporated by reference. In addition, U.S. Published Patent Application No. 2002/0154441 describes some examples of riblets used in conjunction with HDD systems that are applicable to the present invention. Other possible raised windage mitigation features include a hat-shaped formation disposed on a suspension; such as that described in U.S. Provisional Patent Application No. 60/354,119. The presence of features like riblets and air foils on a surface reduces windage excitation. Particular raised features molded on a HAA will vary according to particular characteristics of a HDD system. Typically, raised features will be designed to redress particular issues (e.g., windage and resonance issues) that are problematic within a particular HDD system.

Electrical traces, pads, shuts and other circuitry can be defined in the moldable material 64. Suitable conductors (i.e., metals) can be deposited directly on the moldable material 64 by plating. A platable moldable material is selected for designs where electrical traces and bond pads will be defined in generally exterior portions of the moldable material 64 on the HAA 40. Using an electroplating, electrical plating bath, or other suitable plating process, a conductor is applied to the moldable material 64. Other well-known techniques such as sputtering can also be used. Generally some type of adhesion layer is used when sputtering techniques are used to define conductors in the moldable material 64. Other well-known techniques of increasing adhesion between a conductor and a moldable material can further be utilized. The electrical traces can be defined on the moldable material 64 in an arrangement similar to that shown in FIG. 1B.

In addition, electrical circuitry, such as electrical traces, pads, etc., can be defined on portions of moldable material 64 and operatively connected to other, physically distinct circuitry. For instance, electrical circuitry defined on exterior portions of the moldable material 64 can be operatively connected to circuitry defined on the substrate 62.

Portions of the HAA 40 can be entirely made of the moldable material 64. The arm portion 42, for example, can be made of the moldable material 64 without any metallic substrate acting as a base or core. In addition, portions of the HAA 40 can be made entirely of a metallic material. The arm portion 42, for example, can be stainless steel clad with an aluminum core. Moreover, portions along the HAA 40 (e.g., the pre-load bend region 66 of the suspension portion 44) can have no moldable material disposed thereon.

It may be desired that some portions of an HAA not be overmolded with moldable material. Examples of such portions of an HAA that might not be overmolded include a pre-load bend (PLB) region, mass-reducing features (e.g., through-holes), tooling features, combing features, and inserts (e.g., a bearing cartridge, crash stop, and voice coil motor). FIGS. 4-6 are schematic representations of HAAs according to the present invention. FIG. 4 shows a HAA 90 having a metallic substrate 92 and a moldable material 94 overmolded on portions of the substrate 92. The HAA 90 is similar to the HAA 40 shown and described with respect to FIG. 3. The HAA 90 in FIG. 4 further includes a lift tab 96, a slider 98, a suspension loading portion 100, a pre-load bend region 102, and an arm portion 104. The moldable material 94 is overmolded on most of the HAA 90 except for the pre-load bend region 102 and the slider 98. The substrate 92 can comprise a TGA.

FIG. 5 is a schematic representation of another overmolded HAA 110. The HAA 110 includes a metallic substrate 92 and a moldable material 94 overmolded on portions of the substrate 92. The HAA 90 in FIG. 5 further includes a lift tab 96, a slider 98, a suspension loading portion 100, a pre-load bend region 102, and an arm portion 104. The HAA 10 is generally similar to the HAA 90 of FIG. 4, but the HAA 110 has the moldable material 94 overmolded in a different configuration. The arm portion 140 of the metallic substrate 92 is not overmolded with the moldable material 94, and the metallic substrate 92 would generally have a greater thickness in the arm portion 140 than at overmolded portions of the HAA 110.

FIG. 6 is a schematic representation of a molded HAA 120, which includes a moldable material 94, a lift tab 96, a slider 98, a suspension loading portion 100, a pre-load bend region 102, and an arm portion 104. The molded HAA 120 can be made entirely of moldable material 94, or can include a metallic substrate layer (not shown) with the moldable material 94 disposed thereon along the entire HAA 120.

Figure 7:
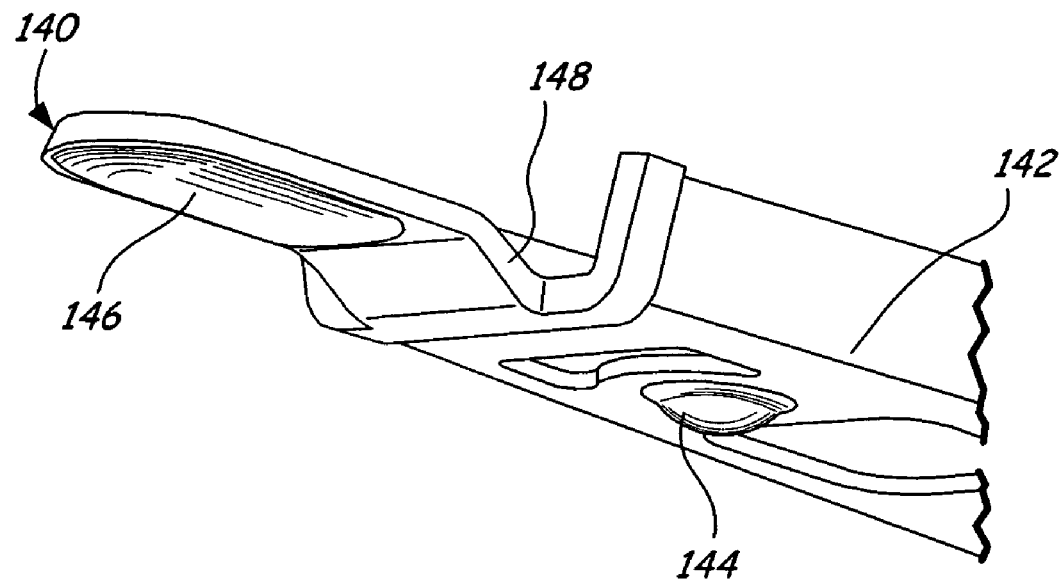
FIG. 7 is a perspective view of a lift tab.
Figure 8:
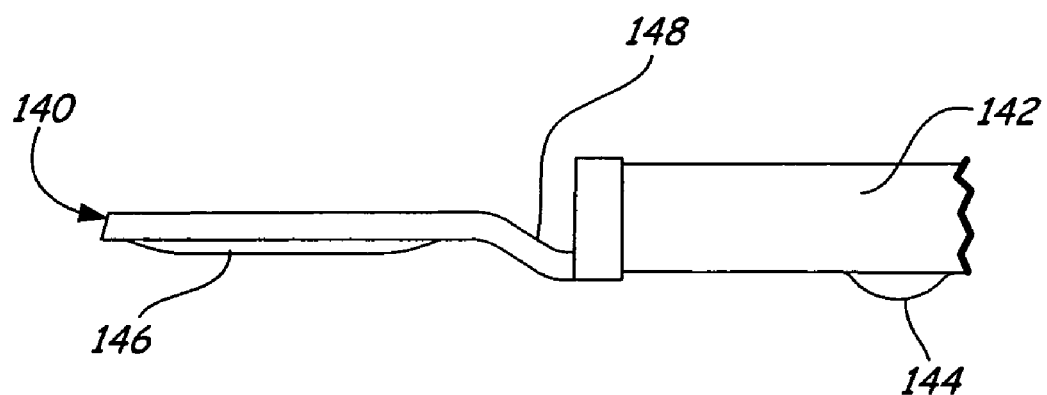
FIG. 8 is a side elevational view of the lift tab of FIG. 7.

FIGS. 7 and 8 are detailed views of an overmolded lift tab 140 according to the present invention. FIG. 7 is a perspective view of the lift tab 140. FIG. 8 is a side elevational view of the lift tab 140. The lift tab 140 is typically disposed at an end of a load beam 142, and extends beyond a load bearing point or "load button" 144 on the load beam 142. A gimbal (not shown) can be pivotably biased at the "load button" 144 for pivotably supporting a slider and transducer (neither shown). The lift tab 140 includes an engagement surface 146 for contacting a support structure, such as a ramp in a L/UL HDD system. The engagement surface 146 can be shaped to reduce tribology issues associated with contacts between the lift tab 140 and an associated support structure. Moreover, the lift tab can be shaped to mitigate other concerns, such as windage excitation. The lift tab 140 can further include a connection portion 148 for positioning the engagement surface 146 in a desired vertical location.

The lift tab 140 comprises a moldable material. Generally that moldable material is disposed along the engagement surface 146 of the lift tab 140. The moldable material used is typically selected to have a hardness similar or identical to a hardness of material comprising engageable portions of an associated support structure (e.g., a L/UL ramp). In some instances, the same material can be used to fabricate engageable portions of the lift tab 140 and the associated support structure.

The lift tab 140 can include a core or base, such as a metallic substrate layer, that is overmolded with a moldable material. Alternatively, the lift tab 140 can be made entirely of moldable material and overmolded to the end of the load beam 142.

In general, it is necessary to attach moldable material to a substrate, because there is usually no natural adhesion between the moldable material and the substrate. The moldable material can be attached to the substrate in a number of ways. Mechanical connections can be used. For example, rivets, line rivets (i.e., rivets having a generally elongate shape), overlapping moldable material structures at an edge of the substrate, or other means of gripping the substrate with the moldable material can be used. In addition, adhesives and other attachment means can be used to attach the moldable material to the substrate.

Figure 9:
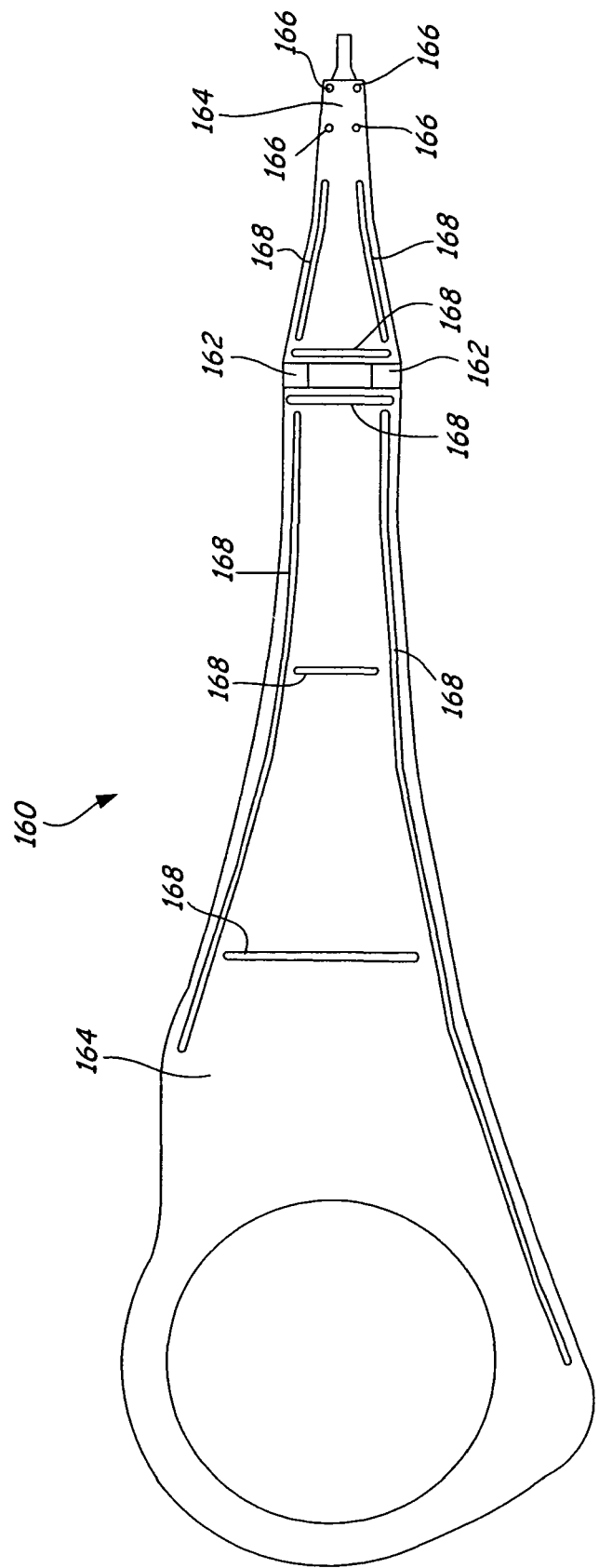
FIG. 9 is a top view of another molded HAA.

FIG. 9 is a top view of another overmolded HAA 160 that includes a metallic substrate 162 and a moldable material 164 attached thereto with rivets 166 and line rivets 168. The rivets 166 and the line rivets 168 are generally used to make a friction-fit or mechanical interference fit with corresponding formations (e.g., holes) at attachment locations on the substrate 162. Positioning of the rivets 166 and line rivets 168 will vary depending upon the shape and configuration of the HAA 160, including, or example, positioning of mass-reducing features along the HAA 160. The rivets 166 and line rivets 168 can be formed of the moldable material 164 or other material.

Figure 10:
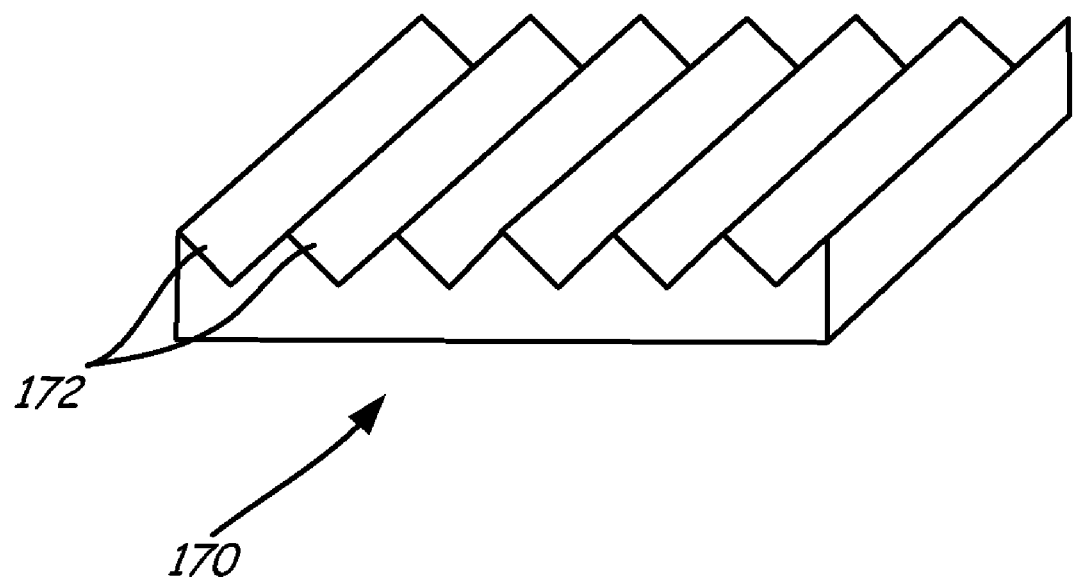
FIG. 10 is a perspective view of a portion of an overmolded HAA.

FIG. 10 is a perspective view of moldable material 170 for an overmolded HAA, illustrating one embodiment of a plurality of riblets 172 molded on the moldable material 170 that can help reduce windage excitation. The illustrated embodiment of the riblets 172 in FIG. 10 is provided by way of example, and not limitation.

Thus, it will be recognized that according to the present invention a HAA, and method of forming the same, provides a number of advantages. An overmolded HAA simplifies fabrication by lessening or eliminating the need for many attachments operations (e.g., eliminates the necessity of a separate arm-to-suspension attachment operation) by combining attachment with an overmolding process for molding HAA components. An overmolded HAA also provides a high stiffness-to-mass ratio for enhancing resonance characteristics and shock performance. Overmolding also provides enhanced design flexibility, which provides the ability to create a variety or three-dimensional and raised features on a HAA. Further, HAAs can be fabricated relatively easily, efficiently, and inexpensively according to the present invention. The present invention is thus distinguishable from laminated load beams, which present significant problems in terms of cost to fabricate, as well as resonance, mass and stiffness-to-mass ratio concerns.

Although the present invention has been described with reference to preferred embodiments, workers skilled in the art will recognize that changes may be made in form and detail without departing from the spirit and scope of the invention.

The invention claimed is:

1. A molded suspension assembly comprising:
   a plastic substrate having a thin and elongate shape;
   a non-metallic material overmolded along at least a portion of one side of the plastic substrate, wherein the non-metallic material interlocks with the plastic substrate; and
   wherein the molded suspension assembly includes a transducer support area at or near a first end of the molded suspension assembly.

2. The suspension assembly of claim 1, wherein the non-metallic material comprises a plastic including a stiffening filler.

3. The suspension assembly of claim 2, wherein the stiffening filler is flowable short-strand carbon fiber.

4. The suspension assembly of claim 1 and further comprising a microactuator assembly, wherein at least a portion of the microactuator assembly and at least a portion of the plastic substrate are overmolded together.

5. The suspension assembly of claim 1, wherein the non-metallic material forms at least a portion of a lift tab.

6. A transducer support assembly comprising:
   a thin substrate, wherein the thin substrate comprises a plastic material; and
   a first molded structure overmolded on at least a portion of the thin substrate layer to substantially define a shape of the transducer support assembly, wherein the first molded structure has a greater thickness than the thin substrate.

7. The transducer support assembly of claim 6 and further comprising a raised structure molded on the first molded structure, wherein the raised structure is located opposite the thin substrate.

8. The transducer support assembly of claim 7, wherein the raised structure comprises a stiffening formation.

9. The transducer support assembly of claim 7, wherein the raised structure comprises a lift tab.

10. The transducer support assembly of claim 7, wherein the raised structure comprises a windage excitation-reducing formation.

11. The transducer support assembly of claim 6 and further comprising a circuit, wherein at least a portion of the circuit and at least a portion of the thin substrate are molded together with the first molded structure.

12. The transducer support assembly of claim 6 and further comprising a microactuator assembly, wherein at least a portion of the microactuator assembly and at least a portion of the thin substrate are overmolded together with the first molded structure.

13. The transducer support assembly of claim 6, wherein the first molded structure comprises a material having a higher stiffness-to-mass ratio than material forming the thin substrate.

14. The transducer support assembly of claim 6, wherein the thin substrate has a thickness less than about 30 microns.

15. The transducer support assembly of claim 6 and further comprising electrical traces formed directly on a plastic exterior portion of the transducer support assembly, the electrical traces being capable of providing electrical connections to a transducer.

16. The transducer support assembly of claim 6 and further comprising electrical connection pads defined on a plastic exterior portion of the transducer support assembly.

17. The transducer support assembly of claim 6 and further comprising a plastic arm, wherein the first molded structure is molded on at least a portion of the plastic arm.

18. A transducer support assembly comprising:
   a thin substrate, wherein the thin substrate comprises a plastic material;
   a first molded structure molded on at least a portion of the thin substrate layer to substantially define a shape of the transducer support assembly, wherein the first molded structure has a greater thickness than the thin substrate; and
   a microactuator assembly, wherein at least a portion of the microactuator assembly and at least a portion of the thin substrate are molded together with the first molded structure.

19. The transducer support assembly of claim 18 and further comprising a raised structure molded on the first molded structure.

20. The transducer support assembly of claim 19, wherein the raised structure comprises a stiffening formation.

21. The transducer support assembly of claim 19, wherein the raised structure comprises a windage excitation-reducing formation.

22. The transducer support assembly of claim 19, wherein the raised structure is located opposite the thin substrate.

* * * * *